United States Patent [19]

Jahr et al.

[11] Patent Number: 4,707,852
[45] Date of Patent: Nov. 17, 1987

[54] UTILITY USAGE DATA AND EVENT DATA ACQUISITION SYSTEM

[75] Inventors: Ronald S. Jahr, Naperville, Ill.; Thomas H. Cowell, Corunna, Mich.

[73] Assignee: Systems and Support, Incorporated, Owosso, Mich.

[21] Appl. No.: 679,627

[22] Filed: Dec. 10, 1984

Related U.S. Application Data

[62] Division of Ser. No. 310,054, Oct. 9, 1981, Pat. No. 4,504,831.

[51] Int. Cl.⁴ .................... H04M 11/00; G08C 19/00
[52] U.S. Cl. ............................... 379/107; 340/870.03
[58] Field of Search ...................... 340/870.02, 870.03, 340/870.11, 870.19, 310 A; 364/483; 179/2 A, 2 AM; 379/106, 107, 92

[56] References Cited

U.S. PATENT DOCUMENTS

| | | | |
|---|---|---|---|
| 3,114,900 | 12/1963 | Anderson | 340/870.11 |
| 3,688,271 | 8/1972 | Rouse | 340/870.03 |
| 3,820,073 | 6/1974 | Vercellotti et al. | 340/870.03 |
| 4,132,981 | 1/1979 | White | 340/870.02 |
| 4,315,251 | 2/1982 | Robinson et al. | 340/870.03 |

Primary Examiner—James L. Dwyer
Attorney, Agent, or Firm—Malcolm R. McKinnon

[57] ABSTRACT

A utility usage data and event data acquisition system effective to acquire input serial data messages representing the amount of consumed utility services and/or binary event data from one or several external sources having differing drive signal requirements, the system also being effective to reformat the input data and append an identification code and an error detection code to the acquired data, and thereafter transmit messages comprising the identification code, the acquired data, the error detection code and other control information to a central location through the agency of coaxial cables, public switched telephone networks or other transmission facilities utilizing data terminals which accept serial binary messages at logic level voltages. Data message transmission is initiated either at random times by an algorithm within the control program of a microprocessor incorporated in the system or from an externally applied command signal.

38 Claims, 6 Drawing Figures

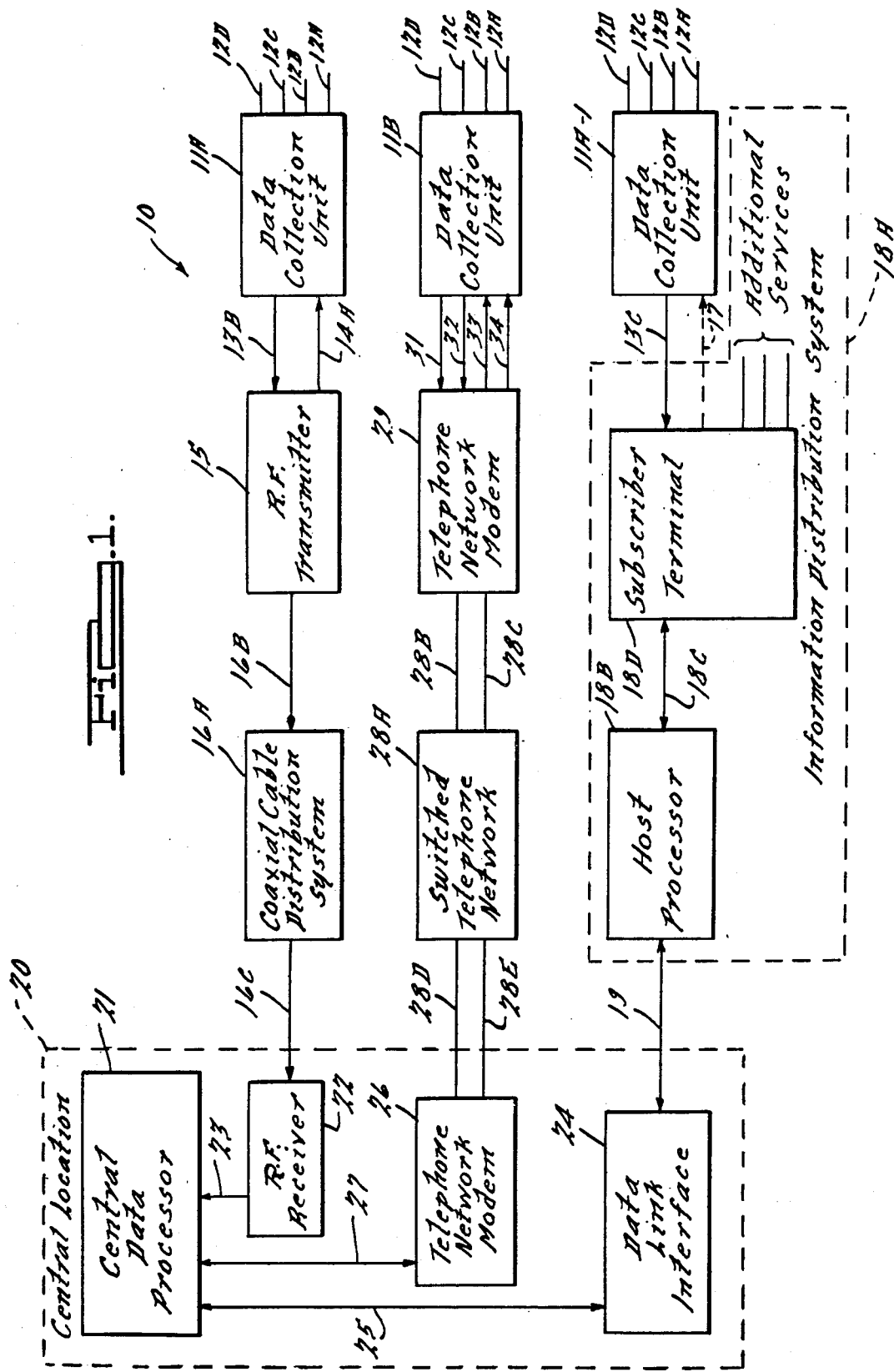

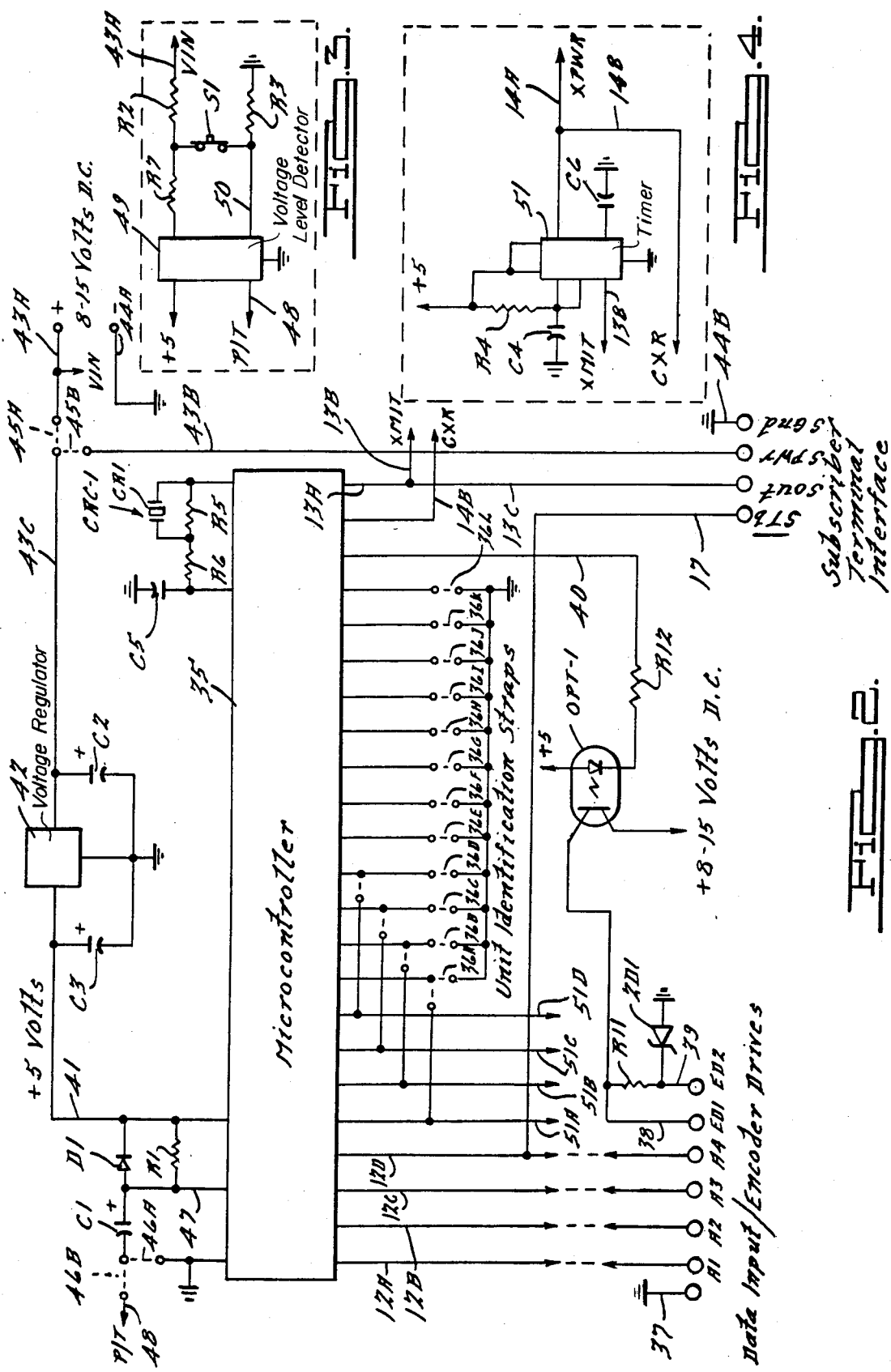

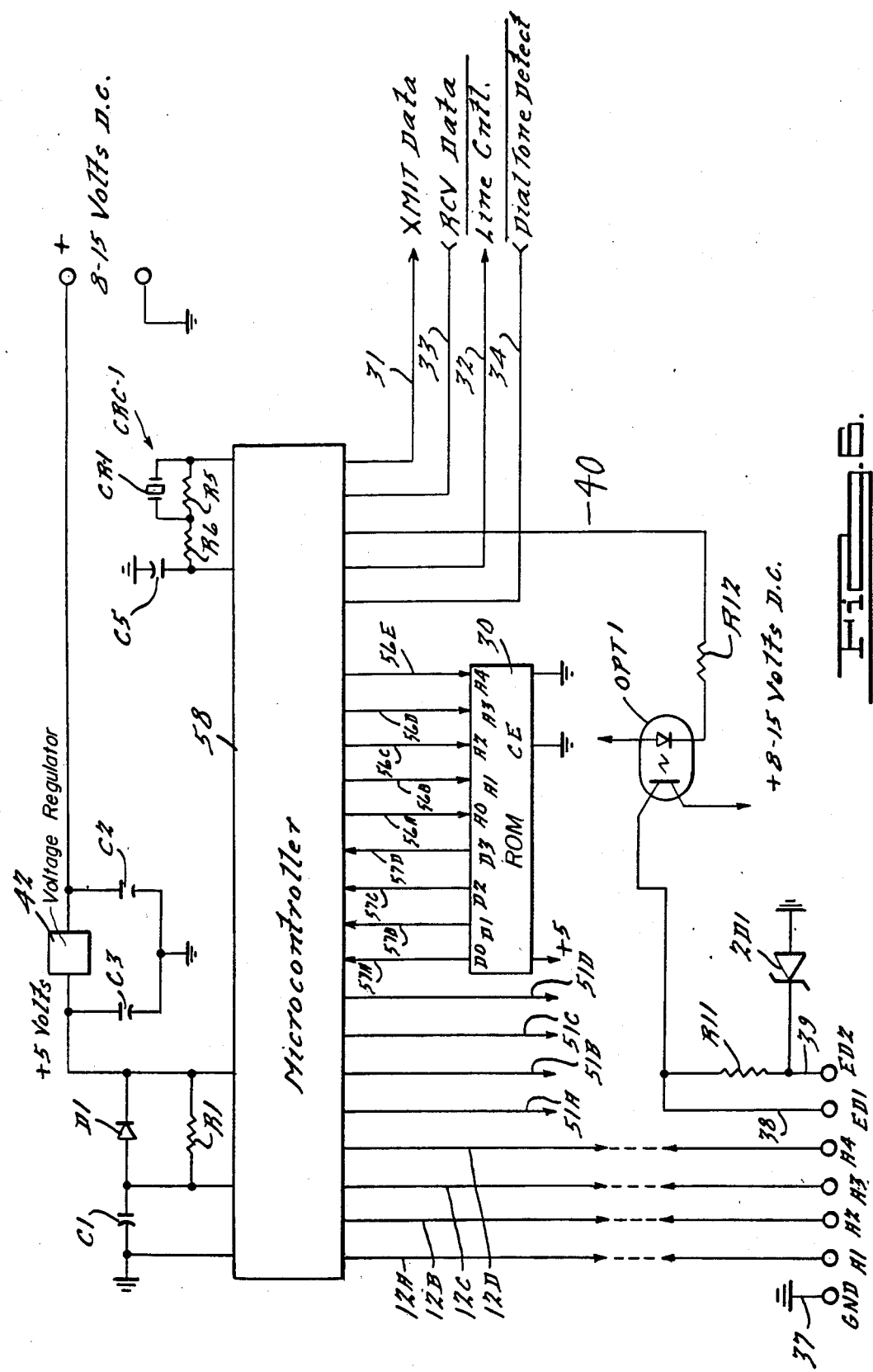

UTILITY USAGE DATA AND EVENT DATA ACQUISITION SYSTEM

This is a divisional of co-pending application Ser. No. 06/310,054 filed on Oct. 9, 1981, now U.S. Pat. No. 4,504,831.

BRIEF SUMMARY OF THE INVENTION

This invention relates to electronic data acquisition systems, and, more particularly, to an improved utility usage data and event data acquisition system for acquiring and transmitting utility usage and event data to a central location. Systems embodying the present invention accept either messages comprising a serial stream of binary digits representing the amount of consumed utility services or binary event data from external sources at each of several inputs to the system. Examples of applications of systems embodying the present invention include, but are not limited to, the acquisition and transmission to a central location of usage data for various utilities such as water, gas and electricity, the acquisition and transmission of event data such as event data respecting the opening and closing of doors, the operation or disablement of valves or switches, the selection of broadcast programs for viewing or listening, and other data such as alarm data respecting fire, intrusion, and medical or other emergencies or conditions. Data acquisition systems embodying the present invention incorporate many features which provide a cost effective alternative to prior manual, semi-mechanized and automatic methods of utility usage data acquisition and processing, a primary application for systems embodying the present invention being to automatically acquire utility usage data for one or more utility services at remote locations near the point of consumption and forward the data to a central location for processing while eliminating many of the costs associated with prior utility meter reading. In addition to reducing the costs associated with prior meter reading, data may be acquired more frequently with systems embodying the present invention so as to eliminate the need for estimated service billing which results when meters are not read at least once every billing cycle. Furthermore, data may be acquired at an even greater frequency to permit time-of-day usage monitoring and/or billing.

A significant feature of systems embodying the present invention is the ability to accept serial binary data messages from electronic utility meter encoders presently in use or available for use with many existing manual reading utility meters. Since the meter readings acquired from these encoders are cumulative and non-volatile, there is no requirement to store the utility usage data within the data acquisition means and thus the data is immune to loss resulting from power interruptions, device failure or transmission failures.

Systems embodying the present invention are adapted to accommodate several different methods of data transmission to a central location. Transmission of the acquired data over a coaxial cable system may be accomplished by interfacing the data acquisition means to a radio frequency transmitter which is directly connected to the coaxial cable system. A receiver at the central location demodulates the radio frequency signals and recovers the data message. Alternatively, the data acquisition means and an associated data processor at a central location may comprise a sub-system of an information distribution system. These systems provide a wide range of advanced telecommunication and subscriber services which may include alarm reporting, energy management, meter reading, pay television services, remote banking and shopping services, and usage sensitive billing among others. In this application, the data acquisition means interfaces directly with a subscriber terminal which communicates with and may be controlled by a host processor at a remote location. Data acquired by the data acquisition means is transmitted to the subscriber terminal and thence to the host processor over transmission facilities utilized by the information distribution system. Transmission facilities utilized by an information distribution system may include coaxial cable, fiber optic cable, a switched or private line telephone network or any combination of these or other transmission media. The acquired data is transmitted to the central location as it is received at the host processor or the acquired data is stored at the host processor and transmitted to the central location upon request from the central location.

Systems embodying the present invention utilize a single-chip microprocessor which significantly reduces the number of discrete analog and digital electronic components which would be required to accomplish the data acquisition task, thus reducing the cost of the system itself and improving reliability. Data message transmission through the system to the central location is initiated at random times determined independently by each acquisition means or by the application of an external logic level command signal to the acquisition means. The present invention further reduces the cost of data collection since bi-directional communication with either the central location or other acquisition means sharing the same communication channel is not required.

In systems embodying the present invention, an error detection code is appended to each data message transmitted by the system to assure, with high reliability, that the data message received at the central location is free of errors introduced during transmission. Moreover, the number of inputs to systems embodying the present invention may be easily expanded with the addition of applique circuitry described hereinafter in greater detail and permitting the system to accommodate a large number of data sources as might be encountered in apartment and commercial complexes. Additional applique circuitry provides a means of detecting an impending power interruption or tamper alarm and transmitting a message with this data to the central location. The data messages transmitted by systems embodying the present invention may be readily adapted for a packet data transmission protocol thus facilitating the application of the invention to current and future data distribution systems.

An object of the present invention is to overcome disadvantages in prior manual, semi-mechanized and automatic methods and apparatus for data acquisition and processing of the indicated character and to provide an improved utility usage data and event data acquisition system incorporating improved means for acquiring utility service usage data at a central location from remote locations which utilize serial binary meter encoding devices.

Another object of the present invention is to provide an improved utility usage data and event data acquisition system capable of utilizing several data transmission media.

Another object of the present invention is to provide an improved utility usage data and event data acquisition system capable of accepting serial binary data from various meter encoding devices or binary event data at any of several inputs to the system.

Another object of the invention is to provide an improved utility usage data and event data acquisition system incorporating improved means providing for the immediate transmission of a data message to a central location upon the occurrence of a binary event at any of several inputs to the system or upon the application of primary power to the system.

Another object of the invention is to provide an improved utility usage data and event data acquisition system which may include optional means for transmitting data messages to a central location at random times determined independently by each remote data acquisition means thus permitting a number of acquisition means to share a common communication channel without such acquisition means communicating with each other or receiving commands from the central location.

Still another object of the present invention is to provide an improved utility usage data and event data acquisition system which, when applied to a switched telephone network, incorporates means for establishing a telephone connection between the remote data acquisition means and the central location at random times determined independently by each acquisition means when it is unlikely that the telephone facility will be required for normal service.

Yet another object of the present invention is to provide an improved utility usage data and event data acquisition system that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a schematic block diagram of a utility usage data and event data acquisition system embodying the present invention and depicting several modes by which the data acquisition means may communicate with a central location;

FIG. 2 is a schematic diagram of the data acquisition means embodied in the system illustrated in FIG. 1;

FIG. 3 is a schematic diagram of an optional applique circuit which may be incorporated within the data collection means to provide advance warning of an impending power interruption to the data collection means or an indication that such means has been tampered with;

FIG. 4 is a schematic diagram of an applique timing circuit which may be incorporated in the data acquisition means when a radio frequency transmitter is utilized to transmit a composite data message to a central location;

FIG. 6 is a schematic diagram illustrating means which permits operation of the system with the public switched telephone network.

DETAILED DESCRIPTION

Figure 5:
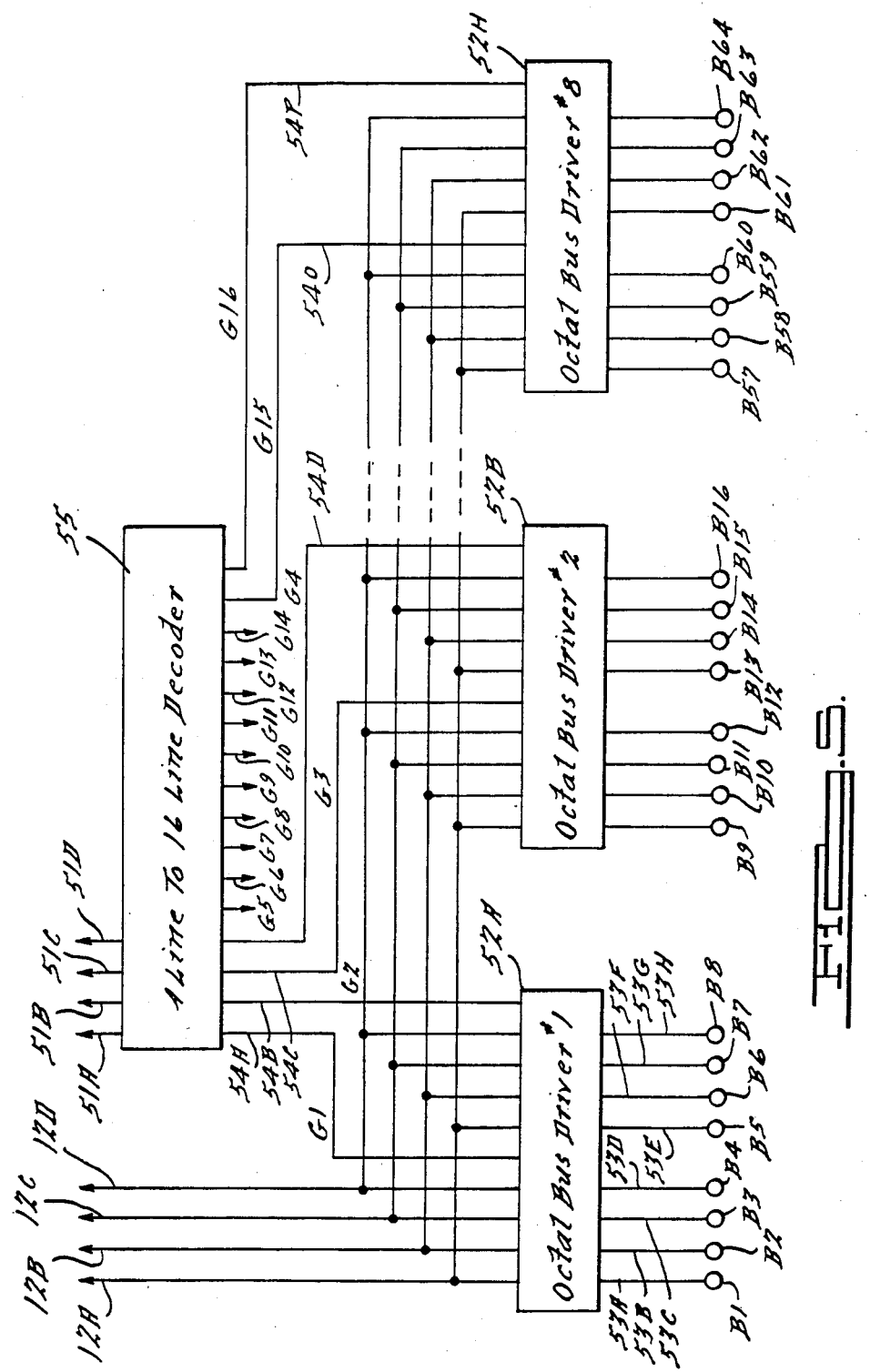
FIG. 5 is a schematic diagram illustrating means for expanding the number of inputs to the system.

Referring to the drawings, a utility usage data and event data acquisition system, generally designated 10, embodying the present invention is illustrated therein.

As shown in FIG. 1, the system 10 includes data acquisition units, generally designated 11A and 11A-1, which are identical and shown in greater detail in FIG. 2. The number 11B designates an alternate embodiment of a data acquisition unit which is shown in greater detail in FIG. 6. The system illustrated in FIG. 1 depicts three different modes by which the data acquisition units 11A, 11A-1 or 11B may communicate with a central location generally designated 20 and transmit a composite serial binary data message which includes data acquired from four inputs, which inputs are designated 12A, 12B, 12C and 12D in all three modes.

Referring to the first mode illustrated, the data acquisition unit 11A transmits a composite serial binary data message (which includes data acquired from inputs 12A, 12B, 12C and 12D) to a radio frequency transmitter 15 at logic level voltages over the lead 13B. The transmitter 15 establishes and modulates a radio frequency carrier signal which carries the composite serial binary data message. The output of the radio frequency transmitter 15 is connected to a coaxial cable distribution system 16A by a coaxial cable 16B. At the central location 20, a radio frequency receiver 22 is connected to the coaxial cable distribution system 16A by a coaxial cable 16C.

The radio frequency receiver 22, which is tuned to the same radio carrier signal frequency produced by the transmitter 15, amplifies, detects and demodulates the radio signal and transmits the recovered composite serial binary data message to the central data processor 21 at logic level voltages over the lead 23. The composite serial binary data messages generated by the data acquisition unit 11A is transmitted at random times. Therefore, in this configuration, a plurality of radio frequency transmitters 15 and their associated data acquisition devices 11A may share a common radio frequency channel with a low probability that two or more transmitters will be activated simultaneously preventing accurate reception of the data messages by the receiver 22.

Referring now to the second communication mode shown in FIG. 1, the data acquisition unit 11B communicates with the central location 20 over a switched telephone network 28A. The data acquisition unit 11B controls a telephone network modem 29 capable of establishing a telephone connection to a similar modem 26 at the central location 20. The data acquisition unit 11B initiates calls to the central location 20 at random times, as for example, between the hours of midnight and 5:00 a.m., when it is unlikely that the dedicated telephone loop 28B and 28C will be required to provide normal telephone service. Following establishment of the telephone connection to the central location 20, the data acquisition unit 11B transmits the serial binary data message which includes data acquired from the inputs 12A, 12B, 12C and 12D to the telephone network modem 29 at logic level voltages over the lead 31. The telephone network modem 29 transmits the composite serial binary data message by shifting an audio frequency carrier between two frequencies corresponding to binary zero and binary one. The audio frequencies are transmitted to the switched telephone network 28A over the subscriber telephone loop 28B and 28C. The telephone network modem 26 at the central location 20 receives the modulated audio frequency carrier signal over a dedicated telephone loop 28D and 28E. The telephone network modem 26 demodulates the composite serial binary data message from the modulated audio frequency carrier signal and transmits the data message to the central data processor 21 at logic level voltages over the lead 27 as it is received.

Referring to the third communication mode shown in FIG. 1, the data acquisition unit 11A-1, which is similar to the data acquisition unit 11A, communicates over the leads 13C and 17 with a subscriber terminal 18D which is part of an information distribution system 18A comprised of a host processor 18B, transmission facilities 18C and the subscriber terminal 18D. The data acquisition unit 11A-1 transmits the composite serial binary data message which includes data acquired from the inputs 12A, 12B, 12C and 12D at logic level voltages to the subscriber terminal 18D at random times or optionally transmits the message upon receipt of a command from the subscriber terminal 18D. The optional command is a logic level voltage change applied to the lead 17 by the subscriber terminal 18D. The composite serial binary data message is transmitted to the host processor 18B over the transmission facility 18C. The host processor 18B then transmits the data message either immediately or upon request from the central data processor 21 over a data link 19 to the data link interface 24 at the central location 20. The data link interface 24 transmits the received composite serial binary data message to the central data processor 21 at logic level voltages over the lead 25.

Although three modes of communication between the data acquisition units 11A, 11A-1 or 11B and the central location 20 are depicted in FIG. 1, any other mode which incorporates facilities capable of transmitting a serial binary data message from the data acquisition units to the central location 20 may be utilized.

FIG. 2 is a schematic diagram of the data acquisition units 11A and 11A-1 which are comprised of a microcontroller 35 that executes a control program contained within the read-only program memory which is an integral part of the microcontroller 35. The microcontroller 35 acquires either serial binary data messages from one to four utility meter encoders connected to the input leads, such as the input leads 12A, 12B, 12C and 12D, respectively, or binary event data from one to four external sources connected to the respective input leads 12A, 12B, 12C and 12D. A composite serial data message including the data acquired at the input leads 12A, 12B, 12C and 12D is transmitted at logic level voltages over the output lead 13A at random times determined by an algorithm within the microcontroller 35 program, upon the application of power to the unit on the leads 43A or 43B, upon the application of an external logic level command signal to the lead 17, or upon the detection of a binary event represented by transition of logic level state at any of the input leads 12A, 12B, 12C or 12D. The output lead 13A may be interfaced with a radio frequency transmitter at the lead 13B or a subscriber terminal unit at the lead 13C for transmission of the composite serial data message to the central location 20 illustrated in FIG. 1.

The composite serial data messages transmitted over the leads 13A, 13B and 13C and thus to the central location 20 include the data acquisition unit identification code, binary event data, data messages from utility meter encoders and an error detection code. The data acquisition unit identification code is a twelve bit code which permits the central location 20 to uniquely identify composite serial data messages from up to four thousand ninety five data acquisition units sharing a common communication channel, i.e., a single radio frequency channel. The identification code for each data acquisition unit is implemented by opening the appropriate normally closed connections 36A through 36L. The binary coded identification ranges in decimal value from zero with all twelve connections 36A through 36L closed to four thousand ninety five with all twelve connections 36A through 36L open. The least significant bit is 36A and the most significant bit is 36L.

With reference to the input leads 12A, 12B, 12C and 12D, the microcontroller 35 acquires serial binary data from one to four utility meter encoders connected to the input leads. Each meter encoder requires three connections to the data acquisition unit: a ground connection to the lead 37, encoder data output connected to one of the four input leads 12A, 12B, 12C or 12D, and an encoder drive signal obtained from leads 38 or 39. Only one meter encoder data output may be connected to any one of the input leads. Two types of meter encoder drive signals are provided. The lead 38 is utilized with meter encoders which require a constant drive voltage of eight to fifteen volts, and the lead 39 is utilized with meter encoders which require a clocked five volt drive. The Zener diode ZD1 regulates the eight to fifteen volt drive to five volts through the dropping resistor R11. The eight to fifteen volt drive voltage is supplied through an optical-isolator OPT1. The conduction of the optical-isolator OPT1 is controlled through a resistor R12 by the microcontroller on the lead 40.

Meter encoders which require a constant drive voltage transmit a serial binary data message which includes the utility usage data upon application of the constant drive voltage. Meter encoders which require a clocked drive transmit a serial binary data message which include the utility usage data only while the drive voltage is clocked or switched between high and low logic levels. Utilizing this difference in the operation of the two types of meter encoders, the acquisition units 11A or 11A-1 accept either type of meter encoder connected to any one of the four inputs 12A, 12B, 12C or 12D without regard to the type of encoder so connected. The acquisition and transmission of utility meter serial encoder data following the initiation of composite data message transmission is accomplished by the microcontroller 35 repeating the following procedure for each of the four inputs 12A, 12B, 12C and 12D in sequence beginning with the input 12A: the microcontroller 35 applies a constant high logic level voltage to the lead 40. The constant high logic level voltage is applied to the light emitting diode within the optical-isolator OPT1 through the resistor R12 and the phototransistor within the optical-isolator OPT1 is forced into saturation and thus switches the eight to fifteen volt supply voltage at the collector of the phototransistor to the encoder drive lead 38. The Zener diode ZD1 and the dropping resistor R11 reduce the constant eight to fifteen volt drive voltage to a constant five volts at the lead 39. Meter encoders connected to the lead 38 or 39 which operate with a constant drive voltage will commence transmission of their serial binary data messages. These messages appear simultaneously on the input leads 12A, 12B, 12C or 12D which connect to the outputs of the meter encoders of the constant drive voltage type. Meter encoders of the type which require a clocked drive voltage will not respond at this time on their respective input leads since the drive voltage is held constant. The microcontroller 35 examines the input lead 12A for a change of logic state which indicates the start of the serial data message from a constant drive voltage encoder. If logic level transitions are detected by the microcontroller 35, the serial data message from the encoder is accepted by the microcontroller 35 as received over the input lead 12A and the message is appended to the composite data message currently in the process of transmission over the lead 13A. If logic level transitions are not detected at the input lead 12A, indicating that no serial encoder of the constant drive voltage type is connected to this input lead, the microcontroller 35 will commence clocking the encoder drive voltage at the leads 38 and 39 by clocking the logic level voltage at the lead 40. A serial encoder of the type which requires a clocked drive voltage connected to the input lead 12A will commence the transmission of the serial data message. The microcontroller 35 detects the serial data message at the input lead 12A as logic level transitions. The serial data message from the encoder is accepted by the microcontroller 35 over the input lead 12A and appended to the composite data message. If neither type of serial encoder is detected at input lead 12A, the microcontroller 35 removes the drive voltage from the leads 38 and 39 by dropping the logic voltage on the lead 40 to a low level and appends null data to the composite data message. The null data indicates to the central location 20 illustrated in FIG. 1 that neither type of serial encoder is connected to input lead 12A. The foregoing process is repeated for each of the remaining input leads 12B, 12C and 12D in sequence, thus acquiring and appending to the composite data message utility usage data from serial encoders connected to the inputs. Thus a system with differing serial encoders communicates with different drive signal formats to the data collection unit.

In addition to acquiring data from utility meter serial data encoders, the data acquisition units 11A or 11A-1 detect and transmit binary event data which occurs at any of the input leads 12A, 12B, 12C or 12D. A binary event is any transition of logic level state, either low to high level or high to low level which occurs at any of the input leads. Sources of binary event data may include, but are not limited to, normally open or normally closed switches or push buttons, relay contacts, or any external circuitry capable of producing a logic state transition at any of the input leads. Each of the four input leads function independently and each may be connected to either a utility meter serial data encoder or a source of binary event data but not both. Each time a binary event is detected at any of the input leads, transmission of the entire composite serial data message over the leads 13A, 13B and 13C is initiated. Composite data messages initiated by binary events are retransmitted twice or more at closely spaced random times to increase the probability that the composite data message including the binary event data is received without error at the central location 20.

A crystal resonant circuit CRC-1 is provided for the microcontroller 35, the crystal resonant circuit being comprised of a crystal CR-1, resistors R5 and R6, and a capacitor C5 which are electrically connected as illustrated in FIGS. 2 and 6.

Referring to FIG. 4, an applique timing circuit is illustrated which is included with the data acquisition unit 11A when the radio frequency transmitter 15 is utilized to transmit the composite data message to the central location 20. The function of this applique timing circuit is to provide power to the transmitter over the lead 14A for the duration of composite data message transmission after which power to the transmitter on the lead 14A is removed thus disabling the radio frequency transmitter 15. Power is applied to the leads 14A and 14B by the applique timing circuit when a high to low level logic state transition occurs on the lead 13B. This transition occurs at the beginning of the composite data message transmission over the leads 13A, 13B and 13C. This high to low logic level transition on the lead 13B triggers an integrated timing circuit 51 which brings the leads 14A and 14B from a low logic level to a high logic level for a fixed time determined by the time constant of the resistor R4 and the capacitor C4. The time constant is chosen to produce a high logic level output at the lead 14A for a duration slightly longer than the time required to transmit the composite data message. Thus the applique timing circuit of FIG. 4 controls power to the radio frequency transmitter and thus controls the maximum duration of the transmitted radio frequency carrier over the coaxial cable 16B. This circuit provides a degree of protection against the possibility of malfunctions which might result in a "locked on" or constant radio frequency carrier which would interfere with the transmissions of other data acquisition units which share a common radio frequency channel. The lead 14B is an input to the microcontroller 35 which permits the microcontroller to monitor the status of the power applied to the transmitter 15. Should a malfunction occur which results in the constant application of power over the lead 14A to the transmitter 15 and thus the transmission of a constant radio frequency carrier, the microcontroller detects this condition over the lead 14B and will commence the continuous transmission of the composite data message over the lead 13B and thus to the central location 20, permitting identification at the central location 20 of the malfunctioning data acquisition unit.

Power for the microcontroller 35 is obtained over the lead 41 from a three-terminal integrated circuit voltage regulator 42 which is connected to capacitors C2, C3 and ground as illustrated in FIGS. 2 and 6. The voltage regulator 42 reduces and regulates the primary eight to fifteen volt supply voltage appearing at the lead 43C to five volts required by the microcontroller 35. The primary eight to fifteen volt supply voltage may be provided from an external DC power supply connected to the leads 43A and 44A or from the subscriber terminal 18D over the leads 43B and 44B. A wiring option 45A and 45B selects the source of the primary eight to fifteen volt supply voltage. The resistor R1, diode D1 and capacitor C1 with the wiring option 46A installed provide a low level reset signal on the lead 47 to the microcontroller 35 each time the primary supply voltage is restored to the lead 43C. The microprocessor 35 transmits a composite data message to the central location following the occurrence of each reset signal at the load 47. Information within the composite data message indicates to the central location 20 that the data message transmission was initiated by a reset signal. The applique circuit depicted schematically in FIG. 3 may be incorporated within the system to generate a reset signal and thus initiate the transmission of a composite data message to the central location 20 upon the detection of an impending interruption of the primary supply voltage or that tampering with a data acquisition unit 11A or 11A-1 has occurred. In the embodiments of the invention incorporating this feature, the wiring option 46B is installed and the option 46A remains open. An integrated circuit voltage level detector 49 produces a low logic level voltage at the lead 48 when the primary supply voltage on the lead 43A falls below the threshold voltage on the lead 50 established by the voltage divider resistors R2 and R3, the resistor R2 also being connected in series with a resistor R7 as illustrated in FIG. 3. The transition from a high to a low logic level on the lead 48 permits the capacitor C1 to begin charging through the resistor R1 thus developing a reset pulse on the lead 47 and initiating the transmission of a reset composite data message to the central location. Capacitors C2 and C3 at the input and output, respectively, of the regulator 42, provide sufficient reserve power to permit the continued operation of the microcontroller 35 during transmission of the reset data message even though primary power has been interrupted. Transmission of a reset composite data message may also be initiated by opening the normally closed tamper switch S1. Removing or disturbing a protective cover (not shown) provided on the data acquisition units 11A or 11A-1 opens the switch S1 and thus causes the voltage on the lead 50 to fall below the threshold value.

FIG. 5 is a schematic diagram of optical applique circuitry which permits the expansion of the number of inputs to systems embodying the present invention from four inputs to a maximum of sixty-four inputs in increments of eight. The expansion of inputs in this manner permits a single data acquisition unit 11A or 11A-1 to acquire utility meter serial encoder data or binary event data from up to sixty-four sources, such as would be found in apartment buildings, office complexes or industrial environments. Input expansion is accomplished by connecting the microcontroller input leads 12A, 12B, 12C and 12D in a bus arrangement to the inputs of from one to eight octal bus driver integrated circuits 52A through 52H. Each octal bus driver is divided into two independently selectable sections each with four inputs. Referring to the octal bus driver 52A, the input leads 53A, 53B, 53C and 53D are associated with the first selectable section, while the input leads 53E, 53F, 53G amd 53H are associated with the second selectable section. Each section of each octal bus driver is selected independently by the application of a low logic level voltage to the enable leads 54A through 54P associated with each section. The application of a low logic level voltage to any of the sixteen possible enable leads gate the corresponding four inputs of the octal bus driver to the microcontroller input leads 12A, 12B, 12C and 12D. Logic level signals appearing at any of the four enabled inputs also appear on the microcontroller input leads 12A, 12B, 12C and 12D. The octal bus driver enable lines 54A through 54P are controlled by a four to sixteen line decoder integrated circuit 55. The sixteen outputs of the decoder 55 are the enable lines 54A through 54P. These outputs and thus the enable lines are brought from a high to a low logic level by the decoder 55 as selected by the binary coded decimal (BCD) inputs 51A, 51B, 51C and 51D of the decoder 55. The BCD value represented by the logic level voltages on the leads 51A through 51D is incremented by the microcontroller 35 from a BCD value of zero through fifteen, thus sequentially enabling each of the possible sixteen, four input sections of the ctal bus drivers 52A through 52H. After each new BCD value is presented to the decoder 55 by the microcontroller 35, thus selecting a specific group of four inputs, the microcontroller 35 acquires the serial binary data messages from utility meter encoders which may be connected to the selected inputs and/or binary event data in the manner previously recited.

FIG. 6 is a schematic diagram of the alternate embodiment of the invention illustrated in FIG. 1 and referenced by the numeral 11B. In this embodiment of the invention, a microcontroller 58 acquires utility usage data from serial meter encoders and binary event data from one or a plurality of sources connected to the leads 12A, 12B, 12C and 12D in an identical manner to that described in connection with the embodiment of the invention illustrated in FIG. 2. However, transmission of the composite serial data message to the central location 20 is accomplished utilizing the switched telephone network 28A. The control program executed by the microcontroller 58 includes a time-of-day routine and a random number algorithm which permit the data acquisition unit 11B to initiate calls to the central location 20 at random times during hours that the telephone loop facility 28B and 28C is not usually required to provide telephone service. Any logic level transition or binary event which occurs on any of the input leads 12A through 12D will also cause the microcontroller 58 to initiate an immediate call to the central location 20. The number of inputs to the data acquisition unit 11B may be expanded in a manner identical to that described for the units 11A and 11A-1 through the addition of the applique circuitry illustrated in FIG. 5 interfaced to the input leads 12A through 12D and leads 51A through 51D.

The microcontroller 58 interfaces to a read-only memory 30 which contains both a unique data acquisition device identification code and the telephone number assigned to the central location 20. The microcontroller 58 accesses the data contained within the read-only memory 30 by establishing five bit addresses on the leads 56A through 56E. The read-only memory 30 decodes each address presented by the microcontroller 58 and returns the contents of the addressed memory location on the leads 57A through 57D to the microcontroller 58 in binary-coded decimal form.

The microcontroller 58 interfaces to the telephone network modem 29, illustrated in FIG. 1, over the leads 31, 32, 33 and 34. To establish a telephone connection with the central location 20, the microcontroller 58 places the modem 29 in an off-hook condition by bringing the line control lead 32 to a low logic level voltage. The microcontroller 58 monitors the dial tone detect lead 34 for a low logic level which indicates that dial tone has been detected by the modem 29. Should a dial tone not be detected, for example within three seconds, the microcontroller 58 abandons the call by returning the line control lead 32 to a high logic level voltage. The microcontroller 58 will wait a random time before it again attempts to obtain dial tone. When dial tone is detected, the modem 29 brings the dial tone detect lead 34 to a low logic level voltage. At this time, the microcontroller 58 reads the telephone number for the central location 20 from the read-only memory 30 one digit at a time out pulsing each digit over the line control lead 32. After out pulsing the telephone number of the central location 20, the microcontroller 58 maintains the modem 29 in an off-hook condition and waits, for example, up to forty-five seconds, for an answer message from the central location 20 over the receive data lead 33 from the modem 29. If an answer message is not received within a preselected time, such as within forty-fove seconds, the microcontroller 58 abandons the call by bringing the line control lead 32 to a high logic level voltage thus returning the modem 29 to an on-hook condition. If the answer message is received within the pre-selected time, the microcontroller 58 transmits the composite serial data message over the lead 31 to the telephone network modem 29 and thus to the central location 20. An answer message transmitted by the central location 20 to the data acquisition unit 11B and thus the microcontroller 58 over the receive data lead 33 includes the current time of day which corrects any accumulated error in the time-of-day maintained within the microprocessor 58. The answer message is the only communication transmitted by the central location 20 to the data acquisition unit 11B. The answer message acts as a go ahead signal to the unit 11B for transmission of the composite serial data message and acts as a confirmation message to the unit 11B when the composite data message is received error free at the central location 20. The microcontroller 58 waits, as for example, up to five seconds, for a confirmation answer message from the central location 20 following transmission of the composite data message. If such answer is not received within the five second time-out period, the microcontroller 58 will retransmit the composite data message up to two additional times waiting five seconds between each transmission for a confirmation answer message. If confirmation is not received, the microcontroller 58 abandons the call by bringing the line control 32 to a high logic level voltage thus returning the modem 29 to an on-hook condition. If confirmation is received from the central location 20, the microcontroller 58 returns the modem 29 to an on-hook condition.

An identification of and/or typical values for the components of the system 10, which are described hereinabove, are as follows:

| | |
|---|---|
| C1 | 10 Mfd |
| C2 | 10 Mfd |
| C3 | 1 Mfd |
| C4 | 8 Mfd |
| C5 | 27 Picofarad |
| C6 | 0.1 Mfd |
| R1 | 6.8K ohm |
| R2 | 1K ohm |
| R3 | 500 ohms |
| R4 | 100K ohm |
| R5 | 1 Meg ohm |
| R6 | 1K ohm |
| R7 | 1K ohm |
| R11 | 330 ohm |
| R12 | 330 ohm |
| D1 | Diode 1N914 |
| ZD1 | Zener Diode 1N5231B |
| OPT1 | Optical-Isolator 4N30 |
| CR-1 | Crystal 3.6 Megacycle |
| 30 | Read-Only Memory 74S288 |
| 35 | Microprocessor COP420 |
| 42 | Voltage Regulator 7805 |
| 49 | IC Voltage Level Detector ICL8211 |
| 51 | Integrated Timing Circuit 555 |
| 52A–52H | Octal Bus Drivers 81LS97 |
| 55 | Line Decoder 74LS154 |
| 58 | Microprocessor COP420 |

While preferred embodiments of the invention have been illustrated and described, it will be understood that various changes and modifications may be made without departing from the spirit of the invention.

What is claimed is:

1. A utility usage data and event data acquisition system comprising, in combination, data acquisition means for automatically acquiring input serial data from a plurality of external sources having differing drive signal formats, said data acquisition means including means for reformatting said acquired data and appending a code to said acquired data, means for transmitting a composite serial data message comprising said acquired data and said code to a central location, and means for initiating the transmission of said composite serial data messages.

2. The combination as set forth in claim 1 wherein said data acquisition means includes a plurality of inputs and means for acquiring input serial data including utility usage data from a plurality of external sources.

3. The combination as set forth in claim 2 including means for acquiring binary event data from a plurality of sources connected to any one of said inputs.

4. The combination as set forth in claim 1 including means for appending an error detection code to said acquired data.

5. The combination as set forth in claim 1 including means for appending an identification code to said acquired data.

6. The combination as set forth in claim 2 including means for expanding the number of said inputs in uniform increments.

7. The combination as set forth in claim 1 including means for initiating the transmission of said composite messages at random times.

8. The combination as set forth in claim 1 including means for initiating the transmission of said composite messages upon the occurrence of a binary event.

9. The combination as set forth in claim 1 including means for initiating transmission of said composite messages upon the occurrence of a logic level voltage transition.

10. The combination as set forth in claim 1 including a primary power supply, means for connecting said power supply to said data acquisition means, and means for initiating transmission of a composite serial data message upon connection of said primary power supply to said data acquisition means.

11. The combination as set forth in claim 1 including an information distribution system, a subscriber terminal incorporated in said information distribution system, and means for coupling a composite serial data message to said subscriber terminal for subsequent transmission to said central location.

12. The combination as set forth in claim 11 including means for obtaining primary power for said data acquisition means from said subscriber terminal.

13. The combination as set forth in claim 11 including means for transmitting a command signal from said subscriber terminal to said data acquisition means, said data acquisition means including means for receiving a said command signal and initiating a composite serial data message to said subscriber terminal for subsequent transmission to said central location.

14. The combination as set forth in claim 1 including means for coupling said composite serial data message to a radio frequency transmitter, a coaxial cable, means connecting said radio frequency transmitter to said coaxial cable, and means including a radio frequency receiver connecting said coaxial cable to said central location.

15. The combination as set forth in claim 14 including a primary power supply for said radio frequency transmitter, and means including a timing circuit controlling the duration of the supply of primary power to said radio frequency transmitter from said power supply.

16. The combination as set forth in claim 1 including a telephone network modem, means for interfacing said data acquisition means to said telephone network modem, said data acquisition means including means for controlling said modem to establish a switched telephone connection between said data acquisition means and said central location.

17. The combination as set forth in claim 16, said data acquisition means including means for storing and accessing a unique identification code for said data acquisition means, means for storing and accessing the telephone number for said central location, and means for establishing a telephone connection to said central location at random times determined independently by said data acquisition means during hours which minimize interference with normal telephone service.

18. The combination as set forth in claim 17, said data acquisition means including means for establishing a telephone connection to said central location upon the occurrence of a binary event.

19. The combination as set forth in claim 17, said data acquisition means including means for establishing a telephone connection to said central location upon the occurrence of a logic level voltage transition at said external source.

20. A utility usage data and event data acquisition system comprising, in combination, data acquisition means including a microprocessor, said data acquisition means including a plurality of inputs for automatically acquiring input serial binary data from a plurality of external sources having differing drive signal formats, said data acquisition means also including means for reformatting said acquired data and appending at least one code to said acquired data, means for transmitting a composite serial data message comprising said acquired data and said code to a central location, and means for initiating the transmission of said composite serial data messages.

21. The combination as set forth in claim 20 wherein said data acquisition means includes a plurality of inputs and means for automatically acquiring input serial binary data including utility usage data from a plurality of external sources.

22. The combination as set forth in claim 21, including means for acquiring binary event data from a plurality of sources connected to any one of said inputs.

23. The combination as set forth in claim 20 including means for appending an error detection code to said acquired data.

24. The combination as set forth in claim 20 including means for appending an identification code to said acquired data.

25. The combination as set forth in claim 20 including means for expanding the number of said inputs in uniform increments.

26. The combination as set forth in claim 20 including means for initiating the transmission of said composite messages at random times.

27. The combination as set forth in claim 20 including means for initiating the transmission of said composite messages upon the occurrence of a binary event at any one of said inputs.

28. The combination as set forth in claim 20 including means for initiating transmission of said composite messages upon the occurrence of a logic level voltage transition at any one of said inputs.

29. The combination as set forth in claim 20 including a primary power supply, means for connecting said power supply to said data acquisition means, and means for initiating transmission of a composite serial data message upon connection of said primary power supply to said data acquisition means.

30. The combination as set forth in claim 20 including an information distribution system, a subscriber terminal incorporated in said information distribution system, and means for coupling said data acquisition means to said subscriber terminal.

31. The combination as set forth in claim 30 including means for obtaining primary power for said data acquisition means from said subscriber terminal.

32. The combination as set forth in claim 30 including means for transmitting a command signal from said subscriber terminal to said data acquisition means, said data acquisition means including means for receiving a said command signal and initiating a composite serial data message to said subscriber terminal for subsequent transmission to said central location.

33. The combination as set forth in claim 20 including a radio frequency transmitter, means for coupling said data acquisition means to said radio frequency transmitter, a coaxial cable, means connecting said radio frequency transmitter to said coaxial cable, and means including a radio frequency receiver connecting said coaxial cable to said central location.

34. The combination as set forth in claim 33 including a primary power supply for said radio frequency transmitter, and means including a timing circuit controlling the duration of the supply of primary power to said radio frequency transmitter from said power supply.

35. The combination as set forth in claim 20 including a telephone network modem, means for interfacing said data acquisition means to said telephone network modem, said data acquisition means including means for controlling said modem to establish a switched telephone connection between said data acquisition means and said central location.

36. The combination as set forth in claim 35, said data acquisition means including means for storing and accessing a unique identification code for said data acquisition means, means for storing and accessing the telephone number for said central location, and means for establishing a telephone connection to said central location at random times determined independently by said data acquisition means during hours which minimize interference with normal telephone service.

37. The combination as set forth in claim 36, said data acquisition means including means for establishing a telephone connection to said central location upon the occurrence of a binary event.

38. The combination as set forth in claim 36, said data acquisition means including means for establishing a telephone connection to said central location upon the occurrence of a logic level voltage transition at any one of said external sources.

* * * * *